(12) United States Patent
Jheng et al.

(10) Patent No.: US 8,772,419 B2
(45) Date of Patent: Jul. 8, 2014

(54) POLYESTER FILMS WITH LOW THERMAL EXPANSION AND METHODS FOR MANUFACTURING THE SAME

(75) Inventors: Li-Cheng Jheng, Kaohsiung (TW); Jrjeng Ruan, Tainan (TW); Ming-Tsong Leu, Kaohsiung County (TW); Kuo-Chen Shih, Kaohsiung (TW); Jyh-Horng Wu, Kaohsiung (TW); Cheng-Hsing Fan, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/494,660

(22) Filed: Jun. 12, 2012

(65) Prior Publication Data

US 2013/0150532 A1 Jun. 13, 2013

(30) Foreign Application Priority Data

Dec. 13, 2011 (TW) .................................. 100145894

(51) Int. Cl.
  *C08L 67/03* (2006.01)
  *C08G 63/189* (2006.01)
(52) U.S. Cl.
  USPC ...................................... 525/444; 264/210.1
(58) Field of Classification Search
  USPC ........................................................ 525/444
  See application file for complete search history.

(56) References Cited

U.S. PATENT DOCUMENTS

| | | | | |
|---|---|---|---|---|
| 4,814,426 A * | 3/1989 | Utsumi et al. | ................ | 528/272 |
| 5,087,526 A | 2/1992 | Tomitaka et al. | | |
| 5,135,783 A | 8/1992 | Harvey et al. | | |
| 5,628,957 A | 5/1997 | Collette et al. | | |
| 5,859,116 A * | 1/1999 | Shih | .............. | 524/493 |
| 5,976,653 A | 11/1999 | Collette et al. | | |
| 6,426,128 B1 | 7/2002 | Kimmel et al. | | |
| 6,773,735 B1 | 8/2004 | Dalgewicz, III | | |
| 7,101,627 B2 | 9/2006 | MacDonald et al. | | |
| 7,147,927 B2 | 12/2006 | Pecorini et al. | | |
| 7,300,703 B2 | 11/2007 | MacDonald et al. | | |
| 7,641,957 B2 | 1/2010 | Robinson et al. | | |
| 2003/0088033 A1* | 5/2003 | Shelby et al. | ................. | 525/444 |
| 2006/0283770 A1 | 12/2006 | Schauer | | |
| 2009/0280342 A1 | 11/2009 | Minnetian | | |
| 2009/0298211 A1 | 12/2009 | Kim et al. | | |
| 2010/0272973 A1 | 10/2010 | Lee et al. | | |
| 2011/0027551 A1 | 2/2011 | Huang et al. | | |
| 2011/0100454 A1 | 5/2011 | Adam et al. | | |

FOREIGN PATENT DOCUMENTS

| | | | | |
|---|---|---|---|---|
| JP | 2001055497 A | * | 2/2001 | .............. C08L 67/02 |
| TV | 200817182 A | | 4/2008 | |
| TW | 304176 | | 5/1997 | |
| TW | M319516 U | | 9/2007 | |
| TW | 201106447 A1 | | 2/2011 | |

OTHER PUBLICATIONS

Lee et al (A Study of Fabrication Polyester Copolymers I—Physical Properties of PET/PETG Blends; Published Jul. 5, 1999).*
Saheb et al (Crystallization and Equilibrium Melting Behavior of PBT/PETG Blends, Journal of Polymer Science Part B: Polymer Physics p. 2349-2444, Published Nov. 24, 1998).*
Eastar PETG 6763 CAS 25038-91-9 record.*
Jheng, et al (Bi-axially Oriented PEN/PETG films with Low Thermal Expansion used as Plastic Substrates for Flexible Electronics, PSME Preprints Mar. 2012).*
TN 8065S CAS 24968-11-4 record.*
Aoki et al., "Dynamic Mechanical Properties of Poly(ethylene terephthalate)/Poly(ethylene 2,6-naphthalate) Blends", Macromolecules, vol. 32, No. 6, 1999, p. 1923-1929.
Cakmak et al., "Necking Mechanism and Its Elimination in Uniaxially Drawn Films of Poly (ethylene naphthalate) (PEN) / Polyetherimide (PEI) Blends", Journal of Applied Polymer Science, vol. 65, 1997, p. 2059-2074.
Callander, "Properties and Applications of Poly(Ethylene 2,6-Naphthalene), its Copolyesters and Blends", Modern Polyesters: Chemistry and Technology of Polyesters and Copolyesters, 2003, p. 323-334.
MacDonald et al., "Engineered Films for Display Technologies", Flexible Flat Panel Displays, 2005, p. 11 to 32.
Turner et al., "Amorphous and Crystalline Polyesters based on 1,4-Cyclohexanedimethanol", Modern Polyesters: Chemistry and Technology of Polyesters and Copolyesters, 2003, p. 267-292.

* cited by examiner

*Primary Examiner* — Randy Gulakowski
*Assistant Examiner* — Christopher M Rodd
(74) *Attorney, Agent, or Firm* — Birch, Stewart, Kolasch & Birch, LLP

(57) ABSTRACT

Disclosed is a method for manufacturing a polyester film with low thermal expansion. 95 wt % to 55 wt % of crystalline polyester and 5 wt % to 45 wt % of amorphous polyester are mixed. The blend is then melt extruded to form a sheet. The sheet is then biaxially stretched to obtain a film. The biaxially stretched film is then treated with a heat-setting procedure.

6 Claims, No Drawings

POLYESTER FILMS WITH LOW THERMAL EXPANSION AND METHODS FOR MANUFACTURING THE SAME

CROSS REFERENCE TO RELATED APPLICATIONS

This Application claims priority of Taiwan Patent Application No. 100145894, filed on Dec. 13, 2011, the entirety of which is incorporated by reference herein.

TECHNICAL FIELD

The technical field relates to polyester films with low thermal expansion and methods for manufacturing the same.

BACKGROUND

In conventional display devices or other electronic devices, a transparent glass substrate is usually selected as a substrate material. However, the trend of display devices and other electronic devices is towards lighter weights and thinner shapes while electronic products usage and the dependence increase with time. Therefore, a flexible display device (or another electronic device) having excellent properties such as mobility, flexibility, wearability, and impact resistance is further demanded. A flexible display device (or the other electronic device) containing TFTs can be manufactured by roll-to-roll process. The batch method for the TFTs can be manufactured by conventional equipment, and a transfer or release process is needed. The release process for the flexible substrate/glass substrate firstly forms TFTs on a flexible substrate attached onto the hard glass carrier. Thereafter, the flexible display device (or the flexible electronic device) is peeled from the hard glass carrier. If a plastic substrate is selected as the flexible substrate, it should meet the requirement of thermal resistance, size stability, and coefficient of thermal expansion. The plastic substrate and the hard glass carrier should have similar coefficient of thermal expansions, thereby avoiding deformation and warping of the plastic substrate during formation processes due to thermal mismatch of the plastic substrate and the hard glass carrier. Standard glass has a coefficient of thermal expansion of about 4 ppm/° C. A plastic substrate having a lower coefficient of thermal expansion close to that of the glass may reduce an interference stress problem caused from the coefficient of thermal expansion difference between the plastic substrate and the glass.

The disclosure provides a novel composition and corresponding processes of plastic films having a low thermal expansion difference and a high transmittance.

SUMMARY

One embodiment provides a polyester film with low thermal expansion, consisting of: 95 wt % to 55 wt % of crystalline polyester; and 5 wt % to 45 wt % of amorphous polyester, wherein the crystalline polyester and the amorphous polyester are mixed with each other.

One embodiment provides a method of manufacturing a polyester film with low thermal expansion, comprising: drying and then mixing 95 wt % to 55 wt % of crystalline polyester and 5 wt % to 45 wt % of amorphous polyester to form a blend; fabricate a sheet from the blend by melt extrusion; fabricate a film from the sheet by biaxial stretching; and heat-setting the film.

A detailed description is given in the following embodiments with reference to the accompanying drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The polyester film with low thermal expansion in the disclosure consists of 95 wt % to 55 wt % of crystalline polyester and 5 wt % to 45 wt % of amorphous polyester. The crystalline polyester and the amorphous polyester are mixed with each other. An overly high amount of the crystalline polyester may decrease the biaxial stretching ratio of the film. An overly low amount of the crystalline polyester may decrease the Tg and the thermal stability of the film.

In one embodiment, the crystalline polyester, which is defined as a kind of polyester having a melting point that can be characterized by differential scanning calorimetry (DSC), can be poly(ethylene-2,6-naphthalate) (PEN) copolymerized of dimethyl-2,6-naphthalene dicaboxylate and ethylene glycol. The PEN copolymer has a weight homogeneously molecular weight of about 10000 to 50000. A PEN with an overly high weight average molecular weight has an overly high melting viscosity, which may not be good for the melt extrusion process and cannot mix with the cyclohexanedimethanol-modified poly(ethylene-terephthalate) copolymerized of terephthalic acid (PETG) so that a compatible phase is not completely formed. A PEN with an overly low weight average molecular weight would make the mechanical strength of a film to not be sufficient.

In one embodiment, the amorphous polyester, which is defined as a kind of polyester having no melting point that can be characterized by differential scanning calorimetry (DSC), can be cyclohexanedimethanol-modified poly(ethylene-terephthalate) copolymerized of terephthalic acid (PETG) copolymerized of terephthalic acid, ethylene glycol, and cyclohexanedimethanol. The PETG has a weight average molecular weight of about 10000 to 50000. A PETG with an overly high weight average molecular weight has an overly high melting viscosity, which may not be good for the melt extrusion process and cannot mix with the PEN to form a completely compatible phase. A PETG with an overly low weight average molecular weight would lead to insufficient mechanical strength. The cyclohexanedimethanol comprises 1,3-cyclohexanedimethanol, 1,4-cyclohexanedimethanol, or combinations thereof. The PETG is copolymerized of diacid and diol. The terephthalic acid accounts for 100 mol % of the diacid (without any other diacid). The cyclohexanedimethanol and the ethylene glycol accounts for 50 to 20 mol %, and 50 to 80 mol % respectively of the total amount of diol. And the total amount of the cyclohexanedimethanol and the ethylene glycol equals to 100 mol % of the diol. A cyclohexanedimethanol occupying an overly high ratio of the diol cannot make the PETG to be the amorphous phase. On the other hand, a cyclohexanedimethanol occupying an overly low ratio of the diol cannot make the PETG to be the amorphous phase as well.

The crystalline polyester such as PEN and the amorphous polyester such as PETG are dried and then homogeneously mixed. In the high temperature processes, a blend with overly high moisture will make the polymer easily degradable thereof, thereby deteriorating the physical properties of a product made therefrom. The polyester can be dried by circulating air-flow at about 90° C. to 120° C. for a period of about at least 36 hours. The poly ester can be dried in a vacuum at about 60° C. to 90° C. for a period of about 4 to 8 hours or longer. Different ratios of polyesters are completely dried and then homogeneously mixed. An overly low drying temperature and/or an overly short drying period would not efficiently remove the moisture in the polyesters.

The blend of the crystalline polyester and the amorphous polyester is processed to form a sheet by melt extrusion using a brabender or a twin screw extruder with a process temperature of 260° C. to 330° C. An overly high melt extrusion temperature may lead the blend to decompose and cause an overly low melting viscosity of the melted blend, thereby making it difficult to extrude the sheet by a T-die. An overly low melt extrusion temperature may cause an overly high melting viscosity of the melted blend, such that a torque value of the extruder is too high to perform the melt extrusion. The twin screw extruder has a spin speed of about 200 rpm to 800 rpm. An overly high spin speed may cause an overly high torque value, such that the melt extrusion process cannot be performed. An overly low spin speed cannot homogeneously mix the crystalline polyester and the amorphous polyester. The melted blend can be extruded by the T-die, and then solidified by a casting drum to form a sheet having a homogeneously uniform thickness. The casting temperature is usually lower than the Tg of the film to ensure that the polyester being quenched from its melt state.

The sheet is then biaxially stretched to form a film. The sheet is pre-heated at a temperature higher than the Tg of the film, and then simultaneously or sequentially stretched at a specific speed in two directions vertical to each other, thereby forming a film with high thermal properties, mechanical properties, planarity, and size stability. In one embodiment, the biaxial stretching can be simultaneously or sequentially performed in a circulating hot air-flow oven. In another embodiment, the biaxial stretching is a continuously two-step stretching process. For example, the sheet is longitudinally stretched by a heat roller to improve its tensile resistance in a mechanical direction (MD), and then transversely stretched (TD) in an oven. In the oven, the longitudinally stretched sheet is firstly heated by circulating hot air-flow and then transversely stretched. The simultaneously biaxial stretching process can be performed by a batch type biaxial stretching machine such as a Bruckner KARO IV. This stretching process makes the film anisotropic due to the molecular orientation. In addition, a circulating hot air-flow oven may provide a suitable air-flow speed by a suitable spin speed (e.g. 1400 rpm to 1800 rpm) during the melt extrusion process. In one embodiment, the biaxial stretching is performed at a stretching speed of about 1%/sec to 40%/sec. An overly high stretching speed will cause an overly high stress that would lead the film broken during the biaxial stretching process. An overly low stretching speed will make it difficult to efficiently enhance film properties. In one embodiment, the biaxial stretching is performed at about 120° C. to 160° C. An overly high stretching temperature may soften the blend film too much to homogeneously conduct uniform stretching. In worst condition, a concave may appear at the center of the film. An overly low stretching temperature will not soften the blend film enough for stretching, such that the film may break during the biaxial stretching process. Stretching ratios at least higher than 3.5×3.5, or of 3.5×3.5 to 9×9, or of 3.5×3.5 to 6×6 may be employed. Generally, a higher stretching ratio may leads to a lower coefficient of thermal expansion of the film product. However, an overly high stretching ratio may cause film breaking.

After the biaxial stretching process, the film is further treated by a heat-setting process. The polymer chains of the biaxially stretched film are torn straight by external stress and temperature, such that molecules thereof migrate to each other to cause a larger deformation. If the biaxially stretched film is directly cooled to a temperature under Tg of the film, an internal residue stress may create which is disadvantageous to the stability of film dimensions. The heat-setting has different effects for different composition. For the crystalline polymer, the heat-setting treatment may accelerate second-crystallization or the crystal growth of the polymer, orientate molecular chains toward the crystal direction, eliminate the internal residual stress of the film, enhance the crystallinity of the film, perfect the crystal structure of the film to strengthen the mechanical properties of the film, and reduce the thermal shrinkage of the film at high temperatures. In one embodiment, the heat-setting is performed at about 180° C. to 250° C. for a period of 5 seconds to 240 seconds. An overly long heat-setting process will not further increase the performance. An overly long heat-setting will not efficiently reduce the thermal shrinkage of the film at a high temperature. In other words, an overly long heat-setting cannot provide enough dimension stability for a film.

After the described mixing, melt extrusion, biaxial stretching, and heat-setting processes, the polyester film having a coefficient of thermal expansion of about 1 ppm/° C. to 12.4 ppm/° C. (even of about 4 ppm/° C. to 10 ppm/° C.) is obtained. Furthermore, the polyester film has a transmittance of 88% to 100%.

Compared to the conventional polyester films, the polyester film of the embodiments having high transmittance and low coefficient of thermal expansion may serve as a flexible plastic substrate in a flexible display device or a flexible electronic device. The flexible display device can be a flexible liquid crystal device or flexible active display device. The flexible electronic device can be a flexible RFID, flexible solar cell, flexible light emitting diode illuminator, flexible printed circuit board, or the likes. The polyester film can especially be applied in flexible active organic light emitting diode device or flexible RFID device. For example, TFTs are formed on the polyester film attached onto the hard glass carrier, and the hard glass carrier is then removed. The TFTs can be formed by an organic TFT (OTFT) process, or a TFT process performed at a temperature lower than 130° C.

EXAMPLES

Example 1

The PEN pellets (Teijin company, TN-8065S, Mw. 35000 Da (Weight Average Molecular Weight)) were vibrating sieved to remove powder dust and tiny fragments on the pellet surface. The PEN pellets were then dried in a circulating hot air-flow oven at 100° C. for 48 hours. The PETG pellets (SK Chemical company, SkyGreen K2010 Mw. 37500 Da) were vibrating sieved to remove powder dust and tiny fragments on the pellet surface. The PETG pellets were then dried in a vacuum at 80° C. for 8 hours. 85 parts by weight of the completely dried PEN and 15 parts by weight of the completely dried PETG were weighted and homogeneously mixed. The blend was melt extruded through a T-die of a twin screw extruder (W&P ZSK 26 TPE Compound, commercially available from Coperion) at a temperature of 255° C. to 310° C. and a spin speed of about 500 rpm, thereby forming a transparent sheet having an uniform thickness by casting with a casting drum at 70° C. The sheet was cut to a size of 117 mm×117 mm, and then put in a biaxial stretching machine (Bruckner KARO IV) for a simultaneous biaxial stretching process. In the biaxial stretching machine, the sheet was pre-heated at 140° C. for 60 seconds. Thereafter, the sheet was simultaneously biaxially stretched at a stretching temperature of 140° C., a stretching speed of 10%/sec, and a stretching ratio of 5×5 to form a film. In the simultaneous biaxial stretching process, a circulating hot air motor was set to have a spin speed of 1700 rpm. Subsequently, the film was heat-set at a temperature of 230° C. for 60 seconds in the biaxial stretching machine.

Example 2

The PEN pellets (Teijin company, TN-8065S, Mw. 35000 Da) were vibrating sieved to remove powder dust and tiny fragments on the pellet surface. The PEN pellets were then dried in a circulating hot air-flow oven at 100° C. for 48 hours. The PETG pellets (SK Chemical company, SkyGreen K2010 Mw. 37500 Da) were vibrating sieved to remove powder dust and tiny fragments on the pellet surface. The PETG pellets were then dried in a vacuum at 80° C. for 8 hours. 75 parts by weight of the completely dried PEN and 25 parts by weight of the completely dried PETG were weighted and homogeneously mixed. The blend was melt extruded through a T-die of a twin screw extruder (W&P ZSK 26 TPE Compound, commercially available from Coperion) at a temperature of 255° C. to 310° C. and a spin speed of about 500 rpm, thereby forming a transparent sheet having an uniform thickness by casting with a casting drum at 70° C. The sheet was cut to a size of 117 mm×117 mm, and then put in a biaxial stretching machine (Bruckner KARO IV) for a simultaneous biaxial stretching process. In the biaxial stretching machine, the sheet was pre-heated at a temperature of 140° C. for 60 seconds. Thereafter, the sheet was simultaneously biaxially stretched at a stretching temperature of 140° C., a stretching speed of 10%/sec, and a stretching ratio of 5.5×5.5 to form a film. In the simultaneous biaxial stretching process, a circulating hot air motor was set to have a spin speed of 1700 rpm. Subsequently, the film was heat set at a temperature of 230° C. for 60 seconds in the biaxial stretching machine.

Example 3

The PEN pellets (Teijin company, TN-8065S, Mw. 35000 Da) were vibrating sieved to remove powder dust and tiny fragments on the pellet surface. The PEN pellets were then dried in a circulating hot air oven at 100° C. for 48 hours. The PETG pellets (SK Chemical company, SkyGreen K2010 Mw. 37500 Da) were vibrating sieved to remove powder dust and tiny fragments on the pellet surface. The PETG pellets were then dried in a vacuum at 80° C. for 8 hours. 85 parts by weight of the completely dried PEN and 15 parts by weight of the completely dried PETG were weighted and homogeneously mixed. The blend was melt extruded through a T-die of a twin screw extruder (W&P ZSK 26 TPE Compound, commercially available from Coperion) at a temperature of 255° C. to 310° C. and a spin speed of about 500 rpm, thereby forming a transparent sheet having an uniform thickness by casting with a casting drum at 70° C. The sheet was cut to a size of 117 mm×117 mm, and then put in a biaxial stretching machine (Bruckner KARO IV) for a simultaneous biaxial stretching process. In the biaxial stretching machine, the sheet was pre-heated at a temperature of 140° C. for 60 seconds. Thereafter, the sheet was simultaneously biaxially stretched at a stretching temperature of 140° C., a stretching speed of 10%/sec, and a stretching ratio of 4.5×4.5 to form a film. In the simultaneous biaxial stretching process, a circulating hot air-flow motor was set to have a spin speed of 1700 rpm. Subsequently, the film was heat set at a temperature of 230° C. for 60 seconds in the biaxial stretching machine.

Example 4

The PEN pellets (Teijin company, TN-8065S, Mw. 35000 Da) were vibrating sieved to remove powder dust and tiny fragments on the pellet surface. The PEN pellets were then dried in a circulating hot air oven at 100° C. for 48 hours. The PETG pellets (SK Chemical company, SkyGreen K2010 Mw. 37500 Da) were vibrating sieved to remove powder dust and tiny fragments on the pellet surface. The PETG pellets were then dried in a vacuum at 80° C. for 8 hours. 85 parts by weight of the completely dried PEN and 15 parts by weight of the completely dried PETG were weighted and homogeneously mixed. The blend was melt extruded through a T-die of a twin screw extruder (W&P ZSK 26 TPE Compound, commercially available from Coperion) at a temperature of 255° C. to 310° C. and a spin speed of about 500 rpm, thereby forming a transparent sheet having an uniform thickness by casting with a casting drum at 70° C. The sheet was cut to a size of 117 mm×117 mm, and then put in a biaxial stretching machine (Bruckner KARO IV) for a simultaneous biaxial stretching process. In the biaxial stretching machine, the sheet was pre-heated at a temperature of 140° C. for 60 seconds. Thereafter, the sheet was simultaneously biaxially stretched at a stretching temperature of 140° C., a stretching speed of 10%/sec, and a stretching ratio of 4×4 to form a film. In the simultaneous biaxial stretching process, a circulating hot air motor was set to have a spin speed of 1700 rpm. Subsequently, the film was heat set at a temperature of 230° C. for 60 seconds in the biaxial stretching machine.

Example 5

The PEN pellets (Teijin company, TN-8065S, Mw. 35000 Da) were vibrating sieved to remove powder dust and tiny fragments on the pellet surface. The PEN pellets were then dried in a circulating hot air-flow oven at 100° C. for 48 hours. The PETG pellets (SK Chemical company, SkyGreen K2010 Mw. 37500 Da) were vibrating sieved to remove powder dust and tiny fragments on the pellet surface. The PETG pellets were then dried in a vacuum at 80° C. for 8 hours. 85 parts by weight of the completely dried PEN and 15 parts by weight of the completely dried PETG were weighted and homogeneously mixed. The blend was melt extruded through a T-die of a twin screw extruder (W&P ZSK 26 TPE Compound, commercially available from Coperion) at a temperature of 255° C. to 310° C. and a spin speed of about 500 rpm, thereby forming a transparent sheet having an uniform thickness by casting with a casting drum at 70° C. The sheet was cut to a size of 117 mm×117 mm, and then put in a biaxial stretching machine (Bruckner KARO IV) for a simultaneous biaxial stretching process. In the biaxial stretching machine, the sheet was pre-heated at a temperature of 140° C. for 60 seconds. Thereafter, the sheet was simultaneously biaxially stretched at a stretching temperature of 140° C., a stretching speed of 10%/sec, and a stretching ratio of 3.5×3.5 to form a film. In the simultaneous biaxial stretching process, a circulating hot air motor was set to have a spin speed of 1700 rpm. Subsequently, the film was heat set at a temperature of 230° C. for 60 seconds in the biaxial stretching machine.

Comparative Example 1

The PEN pellets (Teijin company, TN-8065S, Mw. 35000 Da) were vibrating sieved to remove powder dust and tiny fragments on the pellet surface. The PEN pellets were then dried in a circulating hot air-flow oven at 100° C. for 48 hours. The completely dried PEN was melt extruded through a T-die of a twin screw extruder (W&P ZSK 26 TPE Compound, commercially available from Coperion) at a temperature of 255° C. to 310° C. and a spin speed of about 500 rpm, thereby forming a transparent sheet having an uniform thickness by casting with a casting drum at 70° C. The sheet was cut to a size of 117 mm×117 mm, and then put in a biaxial stretching machine (Bruckner KARO IV) for a simultaneous biaxial stretching process. In the biaxial stretching machine, the sheet was pre-heated at a temperature of 140° C. for 60 seconds. Thereafter, the sheet was simultaneously biaxially stretched at a stretching temperature of 140° C., a stretching speed of 10%/sec, and a stretching ratio of 3×3 to form a film. In the simultaneous biaxial stretching process, a circulating hot air motor was set to have a spin speed of 1700 rpm. Subsequently, the film was heat set at a temperature of 230° C. for 60 seconds in the biaxial stretching machine.

Comparative Example 2

The PEN pellets (Teijin company, TN-8065S, Mw. 35000 Da) were vibrating sieved to remove powder dust and tiny fragments on the pellet surface. The PEN pellets were then dried in a circulating hot air-flow oven at 100° C. for 48 hours. The PETG pellets (SK Chemical company, SkyGreen K2010 Mw. 37500 Da) were vibrating sieved to remove powder dust and tiny fragments on the pellet surface. The PETG pellets were then dried in a vacuum at 80° C. for 8 hours. 50 parts by weight of the completely dried PEN and 50 parts by weight of the completely dried PETG were weighted and homogeneously mixed. The blend was melt extruded through a T-die of a twin screw extruder (W&P ZSK 26 TPE Compound, commercially available from Coperion) at a temperature of 255° C. to 310° C. and a spin speed of about 500 rpm, thereby forming a transparent sheet having an uniform thickness by casting with a casting drum at 70° C. The sheet was cut to a size of 117 mm×117 mm, and then put in a biaxial stretching machine (Bruckner KARO IV) for a simultaneous biaxial stretching process. In the biaxial stretching machine, the sheet was pre-heated at a temperature of 140° C. for 60 seconds. Thereafter, the sheet was simultaneously biaxially stretched at a stretching temperature of 140° C., a stretching speed of 10%/sec, and a stretching ratio of 5.5×5.5 to form a film. In the simultaneous biaxial stretching process, a circulating hot air-flow motor was set to have a spin speed of 1700 rpm. Subsequently, the film was heat set at a temperature of 230° C. for 60 seconds in the biaxial stretching machine.

Comparative Example 3

The PEN pellets (Teijin company, TN-8065S, Mw. 35000 Da) were vibrating sieved to remove powder dust and tiny fragments on the pellet surface. The PEN pellets were then dried in a circulating hot air-flow oven at 100° C. for 48 hours. The PETG pellets (SK Chemical company, SkyGreen K2010 Mw. 37500 Da) were vibrating sieved to remove powder dust and tiny fragments on the pellet surface. The PETG pellets were then dried in a vacuum at 80° C. for 8 hours. 85 parts by weight of the completely dried PEN and 15 parts by weight of the completely dried PETG were weighted and homogeneously mixed. The blend was melt extruded through a T-die of a twin screw extruder (W&P ZSK 26 TPE Compound, commercially available from Coperion) at a temperature of 255° C. to 310° C. and a spin speed of about 500 rpm, thereby forming a transparent sheet having an uniform thickness by casting with a casting drum at 70° C. The sheet was cut to a size of 117 mm×117 mm, and then put in a biaxial stretching machine (Bruckner KARO IV) for a simultaneous biaxial stretching process. In the biaxial stretching machine, the sheet was pre-heated at a temperature of 140° C. for 60 seconds. Thereafter, the sheet was simultaneously biaxially stretched at a stretching temperature of 140° C., a stretching speed of 10%/sec, and a stretching ratio of 3×3 to form a film. In the simultaneous biaxial stretching process, a circulating hot air motor was set to have a spin speed of 1700 rpm. Subsequently, the film was heat set at a temperature of 230° C. for 60 seconds in the biaxial stretching machine.

The process parameters of the Examples and Comparative Examples were tabulated and are shown in Table 1, and the physical properties of the final products thereof were tabulated and are shown in Table 2, respectively. The coefficient of thermal expansion of the films were determined by a thermomechanical analyzer (TMA/TA Q400) at a temperature of 30° C. to 90° C. The thermal shrinkage at a temperature of 130° C. for 30 minutes and at a temperature of 150° C. for 30 minutes of the films were detected by a thermomechanical analyzer (TMA/TA Q400). As shown in Table 2, the coefficient of thermal expansion in all the Examples was lower than 12.4 ppm/° C. In Examples 1-3, the films composed of specific ratios of PETG, biaxially stretched by the high stretching ratios, and heat set by the specific thermal treatment had enough dimension stability and extremely low coefficient of thermal expansion close to that of glass. As shown in Tables 1 and 2, the polyester films composed of a PEN/PETG weight ratio between 85/15 to 75/25 and biaxially stretched by a stretching ratio between 3.5×3.5 to 5.5×5.5 may meet the requirements.

The thermal stability of the films was examined by a dynamic mechanical analyzer (DMA/TA Q800) to determine the Tg of the films. The Tg of the films in all the Examples were close to or greater than 130° C., it means that the films had an acceptable thermal stability to perform in a low-temperature processes of TFT, such as the OTFT process.

The transmittance of the films was analyzed by a haze meter. A higher transmittance means a higher transparency. The film in Comparative Example 1 free of PETG had a transmittance lower than 88%. The films in all Examples had a transmittance higher than 88%.

TABLE 1

| | Mixing | Simultaneously biaxial stretching | | Pre-heating | | Heat-setting | |
|---|---|---|---|---|---|---|---|
| | PEN/PETG ratio | Stretching ratio | Stretching speed (%/s) | Temperature (° C.) | Period (sec) | Temperature (° C.) | Period (sec) |
| Example 1 | 85/15 | 5 × 5 | 10 | 140 | 60 | 230 | 60 |
| Example 2 | 75/25 | 5.5 × 5.5 | 10 | 140 | 60 | 230 | 60 |
| Example 3 | 85/15 | 4.5 × 4.5 | 10 | 140 | 60 | 230 | 60 |
| Example 4 | 85/15 | 4 × 4 | 10 | 140 | 60 | 230 | 60 |

TABLE 1-continued

| | Mixing | Simultaneously biaxial stretching | | Pre-heating | | Heat-setting | |
|---|---|---|---|---|---|---|---|
| | PEN/PETG ratio | Stretching ratio | Stretching speed (%/s) | Temperature (° C.) | Period (sec) | Temperature (° C.) | Period (sec) |
| Example 5 | 85/15 | 3.5 × 3.5 | 10 | 140 | 60 | 230 | 60 |
| Comparative Example 1 | 100/0 | 3 × 3 | 10 | 140 | 60 | 230 | 60 |
| Comparative Example 2 | 50/50 | 5.5 × 5.5 | 10 | 140 | 60 | 230 | 60 |
| Comparative Example 3 | 85/15 | 3 × 3 | 10 | 140 | 60 | 230 | 60 |

TABLE 2

| | Thermomechanical analysis | | | Dynamic mechanical analysis | | Haze meter |
|---|---|---|---|---|---|---|
| | Coefficient of thermal expansion (ppm/° C.) | Thermal shrinkage(%) (130° C., 30 min) | Thermal shrinkage (%) (150° C., 30 min) | Tg, α (° C.) | Storage modulus at 50° C. (Mpa) | Total light transmittance (%) |
| Example 1 | 4.1 | 0.23 | 0.74 | 149.3 | 4815 | 88.6 |
| Example 2 | 9.0 | 0.36 | 0.94 | 136.8 | 4492 | 88.8 |
| Example 3 | 7.6 | 0.16 | 0.68 | 144.7 | 5046 | 88.4 |
| Example 4 | 11.9 | 0.03 | 0.26 | 142.5 | 4546 | 88.2 |
| Example 5 | 12.3 | 0.05 | 0.62 | 145.5 | 4839 | 88.2 |
| Comparative Example 1 | 12.4 | 0.01 | 0.64 | 164.4 | 6848 | 86.6 |
| Comparative Example 2 | 16.2 | 0.63 | 2.91 | 127.0 | 4195 | 89.5 |
| Comparative Example 3 | 22.0 | 0.09 | 0.16 | 141.7 | 3875 | 88.1 |

In the Examples, the polyester film formed by mixing, melt extrusion, biaxial stretching, and heat setting had a coefficient of thermal expansion of less than 12.4 ppm/° C. and greater than or equal to 1 ppm/° C. and a total light transmittance of 88% to 100%. Compared to the conventional polyester films, the polyester film of the embodiments simultaneously owning high transmittance and low coefficient of thermal expansion may serve as a flexible plastic substrate in a flexible display device or a flexible electronic device. The flexible display device can be a flexible liquid crystal device or flexible active display device. The flexible electronic device can be a flexible RFID, flexible solar cell, flexible light emitting diode illuminator, flexible printed circuit board, or the likes. Especially, the polyester film can be applied in a flexible active organic light emitting diode device or flexible RFID device. For example, TFTs are fabricated on the polyester film attached onto the hard glass carrier, and the hard glass carrier is then removed. The TFTs can be fabricated by an organic TFT (OTFT) process, or a TFT process performed at a temperature lower than 130° C.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A polyester film with low thermal expansion, consisting of:
   95 wt % to 55 wt % of poly(ethylene-2,6-naphthalate) copolymerized of dimethyl-2,6-naphthalene dicaboxylate and ethylene glycol as a crystalline polyester; and
   5 wt % to 45 wt % of cyclohexanedimethanol-modified poly(ethylene-terephthalate) copolymerized of terephthalic acid, ethylene glycol, and cyclohexanedimethanol, wherein the ethylene glycol and the cyclohexanedimethanol have a molar ratio of 50:50 to 80:20, and the cyclohexanedimethanol comprises 1,3-cyclohexanedimethanol, 1,4-cyclohexanedimethanol, or combinations thereof as an amorphous polyester,
   wherein the poly(ethylene-2,6-naphthalate) and the cyclohexanedimethanol-modified poly(ethylene-terephthalate) are mixed with each other.
2. The polyester film with low thermal expansion as claimed in claim 1, having a thermal expansion coefficient of 1 ppm/° C. to 12.4 ppm/° C.
3. A method of manufacturing a polyester film with low thermal expansion, comprising:
   drying and then mixing 95 wt % to 55 wt % of crystalline polyester and 5 wt % to 45 wt % of amorphous polyester to form a blend;
   melt extruding the blend to form a sheet;
   biaxial stretching the sheet to form a film; and
   heat-setting the film;
   wherein the crystalline polyester is poly(ethylene-2,6-naphthalate) copolymerized of dimethyl-2,6-naphthalene dicaboxylate and ethylene glycol; and
   wherein the amorphous polyester is cyclohexanedimethanol-modified poly(ethylene-terephthalate) copolymerized of terephthalic acid, ethylene glycol, and cyclohexanedimethanol, wherein the ethylene glycol and the cyclohexanedimethanol have a molar ratio of 50:50 to 80:20, and the cyclohexanedimethanol comprises 1,3-cyclohexanedimethanol, 1,4-cyclohexanedimethanol, or combinations thereof.

4. The method as claimed in claim 3, wherein the step of biaxial stretching the sheet to form the film is performed by a stretching speed of 1%/sec to 40%/sec.

5. The method as claimed in claim 3, wherein the step of biaxial stretching the sheet to form the film is performed with a stretching ratio greater than 3.5×3.5.

6. The method as claimed in claim 3, wherein the step of biaxial stretching the sheet to form the film is performed with a processing temperature of 120° C. to 160° C.

* * * * *